United States Patent Office 3,322,911
Patented May 30, 1967

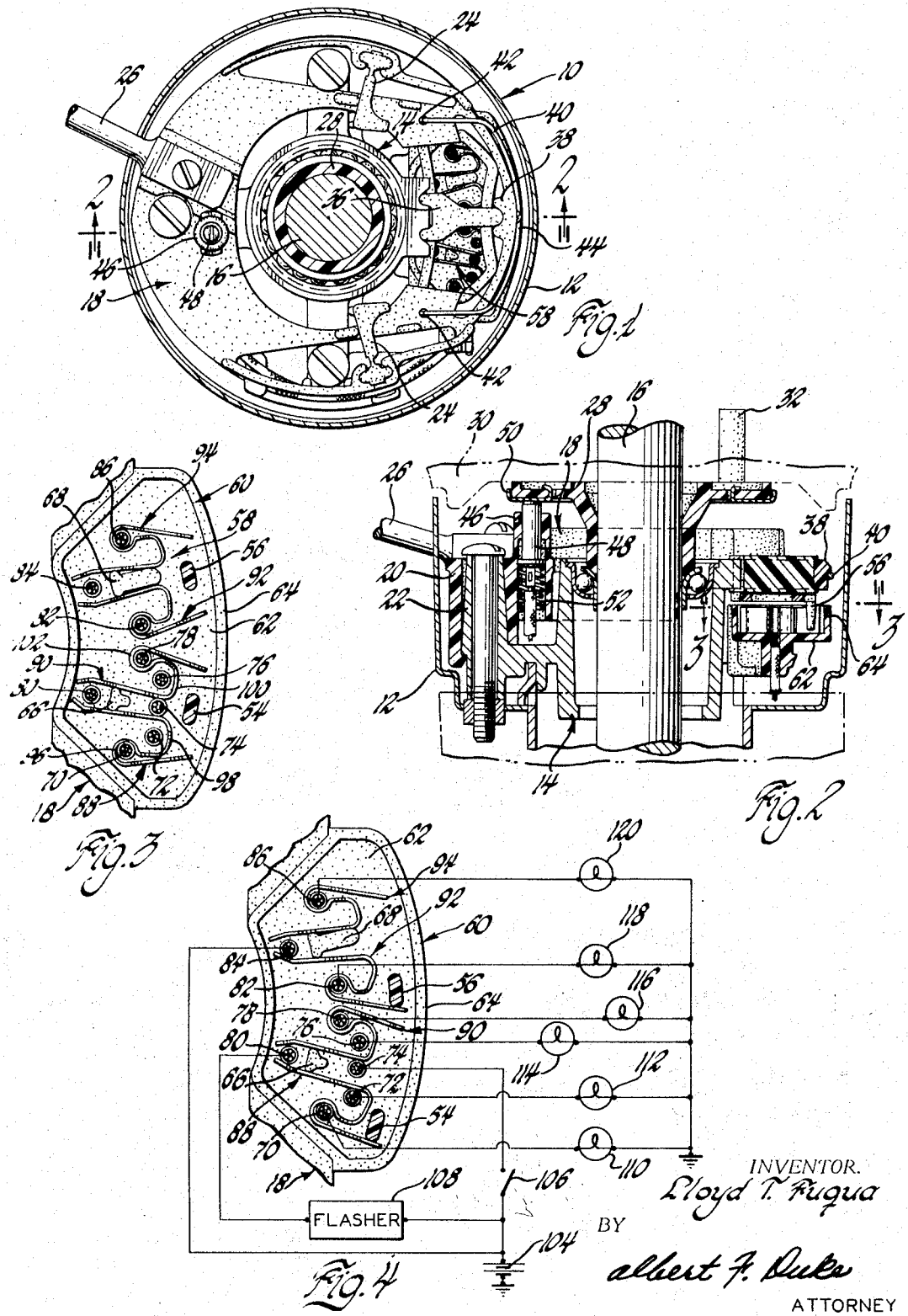

3,322,911
DIRECTION SIGNAL SWITCH INCLUDING UNITARY FLEXIBLE CONTACTS
Lloyd T. Fuqua, Fortville, Ind., assignor to General Motors Corporation, Detroit, Mich., a corporation of Delaware
Filed Oct. 20, 1965, Ser. No. 498,691
2 Claims. (Cl. 200—61.34)

This invention relates to switches and more particularly to a switch which may be used with a direction signaling mechanism for controlling the lamps of a motor vehicle.

In general the prior art direction signalling switches include a plurality of stationary contacts electrically connected between the battery and the signalling lamps which are selectively bridged by manually movable sliding contacts.

The present invention relates to an improved switch structure of the type disclosed in the patent to Barcus et al. 3,200,212 wherein both the stationary and movable contacts are mounted on a single insulating base member and wherein the movable contacts are adapted to be flexed from a normal to an operating position. The switch structure of the present invention consists of a minimum number of parts resulting in a simple, reliable and compact switch.

More specifically, the switch structure of the present invention comprises a plurality of stationary terminals which are selectively bridged by a unitary flexible contact which is self-biased to what is generally referred to as the neutral position but which may be moved into an operating or turn indicating position in response to actuation of the direction signaling mechanism. Moreover, an auxiliary switching mechanism of similar structure is arranged to be operated simultaneously with the direction signal switch and preferably both switches are operated by the direction signal actuating mechanism.

A more complete understanding of the present invention may be had from the following detailed description which should be read in conjunction with the drawings in which:

FIGURE 1 is an elevational view of a direction signaling mechanism containing a switch constructed in accordance with the present invention;

FIGURE 2 is a sectional view taken along lines 2—2 of FIGURE 1;

FIGURE 3 is an enlarged view of the switch structure of the present invention;

FIGURE 4 is similar to FIGURE 3 but showing the switch in a turn indication position and schematically illustrating the wiring arrangement to the vehicle lighting system.

Referring now to the drawings and initially to FIGURES 1 and 2, a direction signaling mechanism generally designated 10 is located within a housing 12 which is secured to the upper end of a vehicle steering column. The mechanism 10 comprises a base member 14 which rotatably receives the vehicle steering shaft 16. A snap-on molded non-conductive actuating member 18 includes a hollow boss 20 for receiving a pivot post 22 projecting from the base member 14. The actuating member 18 is provided with snap-in canceling pawls 24 which are manually movable by a lever 26 into the path of travel of an electrically non-conductive canceling device 28. The vehicle steering wheel 30 shown in phantom is adapted to receive the boss 32 extending upwardly from the canceling device 28 so that the device 28 is rotatable with the steering wheel. The pawls 24 cooperate with canceling cams (not shown) formed on the device 28 in the conventional manner to return the member 18 to a neutral position after the completion of a turn. A more detailed description of the canceling operation may be found in co-pending application Ser. No. 464,809 assigned to the assignee of the present invention.

The member 18 is maintained in either a neutral or operating position by means of a detent arrangement comprising a generally Y-shaped toggle member 36. The member 36 is wedged between cooperating surfaces of the base 14 and a bridging portion 38 of the member 18. During movement of the member 18 from the neutral position to a turn indicating position, the bridging portion 38 of the member 18 will be slightly distorted in an outward direction away from the base 16 as viewed in FIGURE 1 until the toggle member 36 has passed an overcenter position at which time the bridging portion 38 will return to its normal position thereby releasably maintaining the actuating member 18 in an operating position. A reinforcing detent spring 40 has opposite ends received in openings 42 in the actuating member 18 with its intermediate portion 44 in engagement with the bridging portion 38. With this arrangement, the flexing action of the bridging portion 38 is not dependent on the inherent resilience of the portion 38 which may lose some of its resilience when subjected to high temperature.

The member 18 includes an integrally formed upstanding hollow boss 46 for receiving a horn brush 48 which is electrically connected to the vehicle horn relay and which is biased into engagement with a ring contact 50 formed on the underside of the canceling device 26 by means of a spring 52. Electrical contact may then be established through the hollow boss 32 to the horn ring 50 when it is desired to energize the vehicle horn. Member 18 also includes integrally formed downwardly extending fingers 54 and 56 which are adapted to operate a switch generally designated 58.

Referring now to FIGURE 3, the switch 58 includes a molded housing 60 formed of insulating material having a base 62 and a wall 64 surrounding a plurality of stationary and movable contacts. Extending upwardly from the base 62 are two stop members 66 and 68. A plurality of cylindrical terminals 70–86 are molded in the base 62 and are adapted to be selectively bridged by unitary flexible contacts 88–94 of generally S-shape configuration. The terminals 70–80 and the unitary flexible contacts 88 and 90 are intended to control the direction indicating lamps of the motor vehicle, while the terminals 82–86 and the unitary flexible contacts 92 and 94 are intended to control an auxiliary lighting system such as cornering lamps which are located on the motor vehicle to illuminate the area in the direction of the turn. The terminals 70 through 78 are located at predetermined angular and radial distances from the terminal 80 with the unitary flexible contacts 88 and 90 provided between the ends thereof with curved portions 96, 98 and 100, 102 respectively. The portions 96 and 102 are dimensioned to snugly receive the terminals 70 and 78 respectively and thereby maintain continuous electrical contact whether the switch is in a neutral or turn indicating position. The unitary flexible contacts 92 and 94 are likewise adapted to receive and maintain continuous electrical contact with the terminals 82 and 86 respectively. The curved portions 98 and 100 extend between the terminal 74 and the terminals 72 and 76 respectively. One end portion of the contacts 88, 90 and 92, 94 are positioned in the path of movement of the downwardly extending fingers 54 and 56 respectively of the actuating member 18 while the opposite end portions are located adjacent the terminals 80 and 84 being normally biased out of contact with the terminals 80 and 84 by the stop members 66 and 68 respectively.

The electrical connection to the various signaling lamps on the vehicle is shown in FIGURE 4. Referring to FIGURE 4, a battery 104 is connected to the terminal 74 through a brake responsive switch 106 and through a conventional flasher 108 to the terminal 80. The battery 104 is also connected to the terminal 84. Terminals 70, 72, 76 and 78 are connected respectively to the right rear stop and turn lamp 110, the right front turn lamp 112, the left front turn lamp 114, and the left rear stop and turn lamp 116 respectively. The terminals 82 and 86 are connected to auxiliary lamps 118 and 120 respectively which as indicated previously for the purposes of illustration may be the right and left cornering lamps.

Referring again to FIGURE 3, both the direction indicating switch and the cornering switch are shown in the position which they occupy when the actuating member 18 is in the neutral position as shown in FIGURE 1. Accordingly, the unitary flexible contacts 88 and 90 bridge the terminals 70, 74 and 78. Accordingly, the circuit from the flasher 108 to the left and right rear and front lamps 110–116 is open while the circuit from the battery to the right and left rear stop and turn indicating lamps 110 and 116 will be energized upon closure of the brake responsive switch 106. When the actuating member 18 is moved in a clockwise direction to indicate a right turn, the fingers 54 and 56 engage the unitary flexible contacts 88 and 92 and move them about the terminals 70 and 82 respectively to the position shown in FIGURE 4. Under this condition, the terminals 72 and 80 will be bridged by the contact 88 and the terminals 82 and 84 will be bridged by the contact 92. Thus the right front and rear lamps 110 and 112 will be periodically energized while the right cornering lamp 118 will be constantly energized. It will be apparent that if the actuating member 18 is moved in a counterclockwise direction, the flexible contacts 90 and 94 will be engaged by the fingers 54 and 56 to close the circuit to the left signaling lamps 114 and 116 and the left cornering lamp 120.

While the invention has been described with regard to a preferred embodiment thereof, this should not be construed in a limiting sense. Modifications and variations will now occur to those skilled in the art. For a definition of the invention, reference is made to the appended claims.

I claim:
1. A switch comprising electrically non-conductive support means,
   first, second, third, fourth, fifth, sixth, seventh, eighth and ninth stationary terminals mounted in said support means,
   first, second, third and fourth unitary flexible contacts supported by said support means,
   each of said contacts being provided with opposite end portions and first and second immediate curve portions to form a substantially S-shaped configuration,
   one of said curved portions of each of said contacts being dimensioned to snugly receive said first, fifth, seventh and ninth stationary contacts respectively,
   the other curved portions of said first and second contacts normally engaging said third terminal,
   first and second stop means extending from said support means between said first and second and said third and fourth contacts respectively,
   said first stop means normally biasing one end portion of said first and second contacts out of engagement with said sixth terminal and said second stop means normally biasing one end portion of said third and fourth contacts out of engagement with said ninth terminal,
   first and second manually operable electrically non-conductive spaced apart actuator fingers normally extending between said first and second and said third and fourth contacts respectively,
   the opposite end portions of said contacts extending into the path of movement of said fingers.

2. A direction signal switch comprising an electrically non-conductive support, actuator means movable relative to said support from a neutral position to a latched operating position on opposite sides of said neutral position, a plurality of stationary terminals supported by and extending from said support and including at least first, second, third, fourth, fifth and sixth terminals, first and second unitary flexible conductors each having end portions extending from first and second curved portions, one curved portion of each conductor being dimensioned to snugly receive, but rotate relative to said first and said second terminals respectively and maintain continuous electrical contact therewith, the other curved portion of each of said conductors substantially surrounding but out of electrical contact with said third and said fourth terminals respectively and in electrical contact with said fifth terminal when said actuator means is in said neutral position, one end portion of each of said conductors being located adjacent and out of electrical contact with said sixth terminal when said actuator means is in said neutral position, the other end portion of each of said conductors being located in the path of movement of said actuator means whereby in one operative position, one of said conductors completes a circuit between said first, third and sixth terminals and in the other operating position, the other conductor completes a circuit between said second, fourth and sixth terminals.

References Cited

UNITED STATES PATENTS

| | | | |
|---|---|---|---|
| 981,595 | 1/1911 | Lundgren | 200—30 |
| 1,692,819 | 11/1928 | Currier | 200—30 |
| 2,790,939 | 4/1957 | Horlacher | 200—87 |
| 3,200,212 | 8/1965 | Barcus | 200—61.34 |

BERNARD A. GILHEANY, *Primary Examiner.*

H. A. LEWITTER, *Examiner.*